Patented Nov. 10, 1953

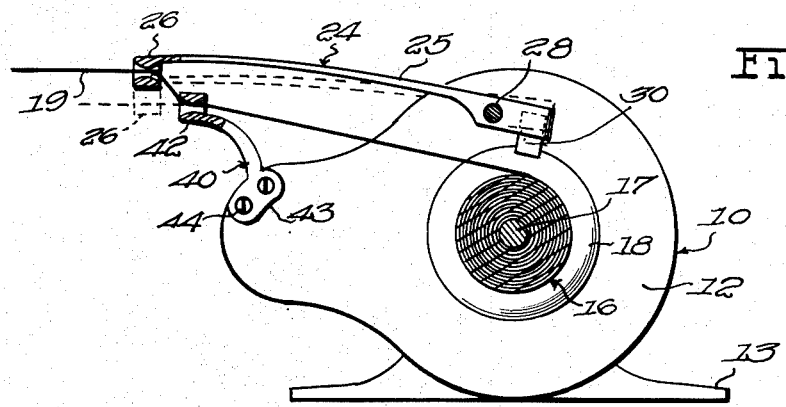
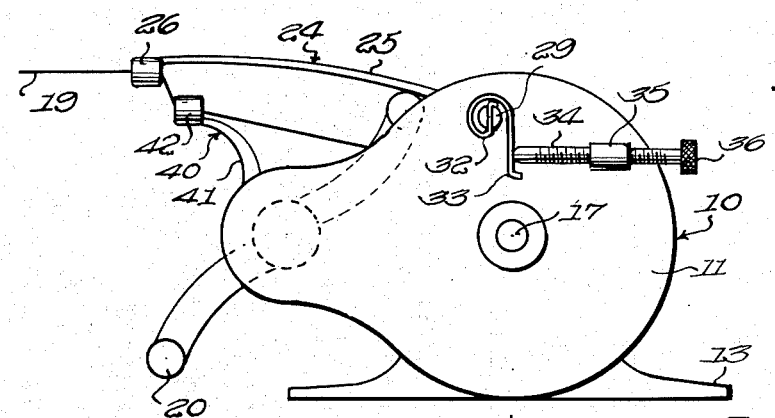
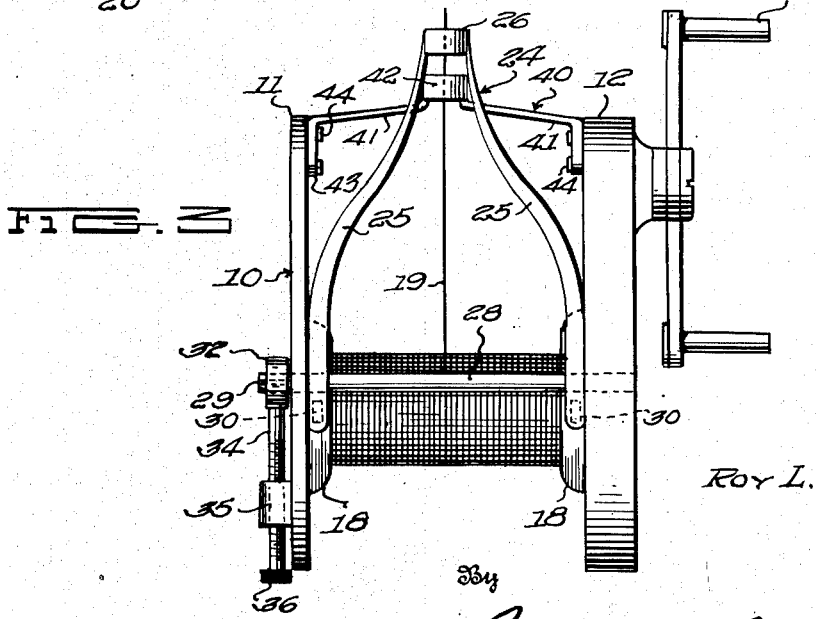

2,658,696

UNITED STATES PATENT OFFICE 2,658,696

ANTIBACKLASH FISHING REEL

Roy L. Cooper, Waterman, Ill., assignor of one-half to Arthur Larsen, Waterman, Ill.

Application December 21, 1948, Serial No. 66,483

4 Claims. (Cl. 242—84.5)

This invention relates to an anti-backlash fishing reel.

As is well known, it is the practice when casting with a fishing reel to subject the reel to a certain amount of braking action to prevent the reel from overrunning the line, under which conditions the very annoying, well-known backlashing action occurs, often resulting in seriously tangling the line. It has been proposed to provide fishing reels with automatic braking devices through which a light braking action automatically is applied when the line slacks, this being the condition under which backlashing occurs. Some of these devices have been reasonably successful in operation but do not provide the desired completely automatic operation of properly lightly braking the reel under all conditions.

An important object of the present invention is to provide a novel type of anti-backlashing device for fishing reels wherein a brake is provided which is inoperative during what may be termed the normal feeding of the line during casting, but which automatically comes into operation to snub the reel to prevent the overrunning thereof if any slack in the line occurs.

A further object of the invention is to provide a device of this character wherein the brake which provides the snubbing action is not affected by lateral whipping of the line between the reel and the tip of the pole while the line is being fed out during the casting operation.

A further object is to provide novel means associated with the reel snubbing device to stabilize the action of the latter and prevent its being affected by any condition other than the longitudinal pull on the line, thus preventing a wobbly braking action which can occur through the whipping of the line between the reel and the tip of the rod.

A further object is to provide a novel mounting for the braking or snubbing device which includes novel means for adjusting the pressure of the snubbing element against the reel.

Other objects and advantages of the invention will become apparent during the course of the following description.

In the drawing, I have shown one embodiment of the invention. In this showing,

Figure 1 is a sectional view through the reel and anti-backlashing device, taken transversely of the reel shaft, Figure 2 is a side elevation of the reel showing the invention applied, and Figure 3 is a plan view of the same.

Referring to the drawing, the numeral 10 designates the fishing reel as a whole comprising frame members 11 and 12 forming side plates adapted to be secured in position on a fishing rod by means of a conventional seat 13. Between the side members 12 is arranged a conventional spool 16 rotatably supported with respect to the side members by a shaft 17, the opposite ends of the spool being provided with the usual flanges 18 between which the line 19 is adapted to be wound. The side member 12 is provided with the usual mechanism, customarily gearing (not shown) operable by handle cranks 20 for rotating the spool 16.

The braking or snubbing device is indicated as a whole by the numeral 24 and comprises a pair of arms 25 converging toward their forward ends and rigidly connected at such ends by an eye 26. The rear ends of the arms 25 lie adjacent the inner faces of the side members 11 and 12 respectively as shown in Figure 3, and these arms are fixed to a transverse shaft 28, one end of which extends through and beyond the side member 11 as at 29. Rearwardly of the shaft 28, each arm 25 is provided with a braking or snubbing element 30 engageable with the adjacent flange 18 of the spool.

As previously stated, the arms 25 are fixed to the shaft 28, which is mounted to lock in the side members 11 and 12 and means is provided for adjusting the pressure of the snubbing elements 30 against the flanges 18 when the device is in operation. As clearly shown in Figure 2, the projecting end 29 of the shaft 28 is slotted to receive one end of a leaf spring 32. This spring curves around the shaft extension 29 and has its free end 33 extending downwardly for engagement with the screw 34. This screw is threaded in a stud 35 carried by the side member 11 and is provided with a preferably knurled head 36 to facilitate the turning of the screw.

Means is provided for stabilizing the action of the braking device. The stabilizing means is indicated as a whole by the numeral 40 and comprises a pair of arms 41 having their inner ends arranged adjacent each other and rigidly connected by an eye 42. The other ends of the arms 41 are bent to provide feet 43 arranged against the inner faces of the side members 11 and 12 and secured thereto as at 44.

Operation

The parts occupy the normal positions shown in Figure 1, the snubbing device 30 being in light snubbing engagement with the flanges 18. The pressure of such engagement will be determined by the tension of the spring 32 in accordance with the adjustment of the screw 34. With the parts in the positions referred to, it will be noted that the eye 42, which is stationary, is offset downwardly slightly from the eye 26, the two eyes being arranged in relatively close proximity. Forwardly of the eye 26, the line 19, of course, extends to and passes through the conventional guides or eyes on the fishing rod. The particular angle between the axis of the eye 26 and the nearest eye or guide on the rod is unimportant and plays no part in the functioning of the present device. It is particularly noted, however, that the eyes 26 and 42 are in close proximity, as stated, and are normally slightly offset as in Figure 1, and in view of these two factors, there is a relatively sharp bend in the line 19 between the eyes 26 and 42 when the eye 26 is in normal position. It also will be noted that the eye 26 is movable to a position in, or substantially in, alignment with the eye 42. The operator will cast in the usual manner, holding the spool 16 with his thumb until the proper whipping action of the rod is ready to pull the line 19 upwardly. The spool is then released to unwind the line in accordance with the pull exerted thereon.

As previously stated, relatively light snubbing contact is provided between the snubbing elements 30 and the flanges 18. The lever arm between the shaft 28 and eye 26 being very much longer than the lever arm between the shaft 28 and snubbing device 30, it will be obvious that very little downward force on the eye 26 is required to swing the arms 25 downwardly to the dotted line position shown in Figure 1. In such position of the arms 25, the eye 26 will be arranged almost directly in front of and almost directly in alignment with the eye 42, the line thus feeding in almost a perfectly straight line through the two eyes. The force required to swing the arm 25 downwardly in the manner stated is so slight as to be substantially negligible and accordingly the lateral force on the eye 26 caused by the tendency of the arms 25 to return to normal position effects negligible braking action on the line 19. As previously stated, the line 19 partakes of a sharp bend between the eyes 26 and 42 when the former is in its normal position. Therefore, when any pull occurs on the line 19, there will be a relatively substantial component of force transmitted to the eye 26 transverse to the axis thereof, and accordingly only a slight pulling force on the line 19 is necessary to release the snubbing device. If, for any reason, the spool 16 tends to overrun the unreeled line 19, the arms 25 will immediately return to normal position and the snubbing elements 30 will engage the flanges 18 to snub the spool and thus prevent the overrunning thereof.

As soon as the pulling forces on the line 19 stop, it will be obvious that the result referred to above will take place. Tension on the line 19 will be completely relieved and the arms 25 will swing outwardly to snub the spool and thus prevent the occurrence of the highly annoying backlash. As previously stated, the pressure of the snubbing elements 30 against the flanges 18 is readily adjustable by turning the screw 34 for adjusting the tension of the spring 32. This tension is applied through the shaft 28 to the arms 25, fixed to the shaft.

Particular attention is invited to the fact that the substantial length of line between the eye 26 and the tip of the fishing rod is such that the intervening line can readily whip due to the pulling of the line and the high degree of flexibility of the line. This whip also can be caused by the wind. In the absence of the eye 42, the whip of the line can cause a false reduction in the tension of the line before the line has finished paying out. The use of the stationary eye 42 in close proximity to the eye 26 causes the eye 42 to provide a stabilizing action on the snubbing device, it being necessary for an actual slacking of the pull on the line 19 to occur before the snubbing action will take place. Thus it has been found that the snubbing elements of the present device will positively remain out of engagement with the spool until the line has finished paying out, or unless the spool tends to overrun. In the latter case, assuming that a pull is still exerted on the line 19, the snubbing device will snub the rotation of the spool only momentarily and the restoration of the pull on the line 19 will promptly move the snubbing device to inoperative position.

I claim:

1. An anti-backlash device for a fishing reel having a spool, comprising a lever pivotally mounted on the reel, said lever projecting a relatively short distance rearwardly of its pivotal connection with said reel and a substantially longer distance forwardly of its pivotal connection with said reel, a snubbing element carried by the rear end of said lever and engageable with said spool, an eye carried by the forward end of said lever providing a substantially circular opening therein through which a line from said spool may be threaded, means biasing said lever to a normal position in which said snubbing element engages the spool, and a stationary device fixed to said reel and including an eye fixedly mounted rearwardly of and in close proximity to said first-named eye and having a substantially circular opening therein similar to said first-named opening, the opening in said first-named eye, when said lever is in its normal position, being disposed upwardly of and slightly out of alignment with the opening in said stationary eye in a manner such that a line from said spool threaded successively through said openings will have an upwardly and forwardly inclined portion between said eyes, whereby when such line is under tension, said first-named eye will be moved downwardly to a position wherein the openings in said eyes are in substantial alignment with each other to move the forward end of said lever downwardly and release the snubbing element from the spool.

2. An anti-backlash device for a fishing reel having side members and a spool arranged therebetween, comprising an elongated lever, a shaft pivotally supported by said side members and to which said lever is fixed, said lever projecting a relatively short distance rearwardly of said shaft and a substantially longer distance forwardly of said shaft, a snubbing element carried by the rear end of said lever and engageable with said spool, an eye carried by the forward end of said lever through which a line from said spool may be threaded, means biasing said lever to a normal position in which said snubbing element engages the spool, and a stationary device fixed to said side members and including an eye fixedly mounted rearwardly of and in close proximity to said first-named eye, said first-named eye, when said lever is in its normal position, being disposed upwardly of and slightly out of alignment with said stationary eye in a manner such that a line from said spool threaded successively through said stationary eye and said first-named eye will have an upwardly and forwardly inclined portion between said eyes, whereby when such line is under tension, said first-named eye will be moved downwardly toward a position in alignment with said stationary eye to move the forward end of said lever downwardly and release the snubbing element from the spool.

3. An anti-backlash device of the type set forth in claim 2 in which said biasing means comprises a leaf spring fixed at one end to said shaft, and adjustable means carried by one of said side members and engaging the other end of said spring to adjust the tension thereof to predetermine the pressure of said snubbing element against the spool.

4. An anti-backlash device for a fishing reel having side members and a spool journaled therebetween and provided with flanges adjacent the side members, comprising a lever formed of a pair of arms converging forwardly, the rear ends of said arms being arranged inwardly of and adjacent the side members of the reel, a shaft pivotally supported by the side members of the reel and to which said arms are fixed, said arms projecting a relatively short distance rearwardly of said shaft and a substantially longer distance forwardly of said shaft, said arms being provided at their forward ends with an eye, snubbing elements carried by the rear ends of said arms and engageable with the flanges of the spool, resilient means biasing said lever to a normal position with said snubbing elements engaging the spool flanges, and a stationary device fixed to the side members of the reel and comprising an eye fixedly mounted with respect to said reel rearwardly of and in close proximity to said first-named eye, said first-named eye, when said lever is in its normal position, being arranged upwardly of and slightly out of alignment with said stationary eye in a manner such that a line from said spool threaded successively through said stationary eye and said first-named eye will have an upwardly and forwardly inclined portion between said eyes, whereby when such line is under tension, said first-named eye will be moved downwardly toward a position in alignment with said stationary eye to move the forward end of said lever downwardly and release the snubbing elements from the spool flanges.

ROY L. COOPER.

References Cited in the file of this patent

UNITED STATES PATENTS

| Number | Name | Date |
|---|---|---|
| 1,303,525 | Wherry | May 13, 1919 |
| 1,580,524 | Nelson | Apr. 13, 1926 |
| 2,059,519 | Harris | Nov. 3, 1936 |
| 2,261,610 | Yarosz | Nov. 4, 1941 |
| 2,262,462 | Margis | Nov. 11, 1941 |
| 2,326,645 | Hill | Aug. 10, 1943 |
| 2,374,551 | Margis | Apr. 24, 1945 |
| 2,487,316 | Daniel | Nov. 8, 1949 |
| 2,516,517 | Hutchinson | July 25, 1950 |
| 2,613,047 | Kelso | Oct. 7, 1952 |